United States Patent [19]

Yagi et al.

[11] 3,842,810

[45] Oct. 22, 1974

[54] CARBURETOR

[75] Inventors: Shizuo Yagi, Asaka; Minoru Atsumi, Kautagoe, both of Japan

[73] Assignee: Honda Giken Kogyo Kabushiki Kaisha, Tokyo, Japan

[22] Filed: Nov. 27, 1972

[21] Appl. No.: 309,744

[52] U.S. Cl.......... 123/32 R, 123/127, 123/32 ST, 123/52 M, 123/119 R
[51] Int. Cl. ... F02b 19/10, F02b 19/16, F02b 19/18
[58] Field of Search............ 123/127, 32 ST, 32 SP, 123/32

[56] References Cited
UNITED STATES PATENTS

| | | | |
|---|---|---|---|
| 3,186,691 | 6/1965 | Manning............................. | 123/127 |
| 3,205,879 | 9/1965 | Von Seggern ...................... | 123/127 |
| 3,364,911 | 1/1968 | Baudry................................ | 123/127 |
| 3,439,658 | 4/1969 | Simonet .......................... | 123/32 ST |
| 3,648,674 | 3/1972 | Proctor.............................. | 123/127 |
| 3,659,564 | 5/1972 | Suzuki............................. | 123/32 ST |

*Primary Examiner*—Laurence M. Goodridge
*Assistant Examiner*—Ronald B. Cox
*Attorney, Agent, or Firm*—Lyon & Lyon

[57] ABSTRACT

A carburetor assembly is provided for an internal combustion engine having one or more cylinders each provided with an auxiliary chamber associated with each main combustion chamber, the chambers each being connected by a torch nozzle. A spark plug is associated with each auxiliary chamber. The carburetor assembly supplies a lean mixture to the main combustion chambers and a rich mixture to the auxiliary combustion chambers. The throttle valves which regulate the flow of lean mixture and rich mixture are interconnected by cam and follower mechanisms so that the quantity of air admitted into each chamber remains correct for optimum combustion over the full range of engine speeds from idle to full throttle. The carburetor assembly has a main primary passage and a main secondary passage both supplying lean mixture to the main combustion chambers. The carburetor assembly also has a single auxiliary passage supplying rich mixture to the auxiliary combustion chambers. The passages are arranged in a straight line with the auxiliary passage closest to the engine and with the main secondary passage positioned between the main primary passage and the auxiliary passage.

11 Claims, 7 Drawing Figures

CARBURETOR

This invention relates to carburetors for internal combustion engines and is particularly directed to a carburetor for use with engines having one or more cylinders each providing a main combustion chamber, and an auxiliary combustion chamber connected to each main chamber through a torch nozzle. Each auxiliary chamber is provided with a spark plug. A lean mixture is supplied to each main chamber and a rich mixture is supplied to each auxiliary chamber. Reference is made to the copending application of Date et al. Ser. No. 291,254 filed Sept. 22, 1972, which discloses an internal combustion engine of this type.

It is the general object of this invention to provide a carburetor assembly which simultaneously furnishes a rich mixture and a lean mixture, which carburetor assembly is constructed to provide careful regulation and control of the air weight inducted into each auxiliary chamber as compared to the air weight inducted into each main chamber, as well as to provide such regulation and control for the air-fuel ratio of the mixture delivered to the auxiliary chamber and the air-fuel ratio of the mixture delivered to the main chamber, under all driving conditions. Control of these variables is needed in order to minimize the production of unwanted air pollutants in the exhaust of the engine such as carbon monoxide, unburned hydrocarbons, and the oxides of nitrogen.

For convenience, the following nomenclature will be employed in describing this invention:

the ratio $\lambda$
$$= \frac{\text{air weight inducted into auxiliary chamber}}{\text{air weight inducted into main chamber}}$$

$Qa$ = quantity of air inducted into auxiliary combustion chamber during intake stroke $Qm$ = quantity of air inducted into main combustion chamber during intake stroke $Va$ = volume of auxiliary chamber $\alpha a$ = air-fuel ratio of the mixture delivered to the auxiliary combustion chamber $\alpha m$ = air-fuel ratio of the mixture delivered to the main combustion chamber $\eta a$ = scavenging efficiency of auxiliary chamber The variables $\lambda$, $\alpha a$ and $\alpha m$ must be properly controlled as the engine load varies from idling to full load. It is highly desirable that the air quantity $Qa$ inducted into the auxiliary chamber during an intake stroke be maintained as constant as possible, regardless of engine load variation. However, it is not possible on a practical basis to maintain the air quantity $Qa$ exactly constant over the wide range of engine operation from idling to full load, but it has been found that satisfactory results are obtained if the air quantity $Qa$ varies no more than 1 to 4 times the volume $V$ of the auxiliary combustion chamber.

$Qa/Va$ is the delivery ratio "K" and the relationship between K and the scavenging efficiency $\eta a$ is as follows:

1. At full auxiliary throttle valve opening $\eta a$ is about 70% when K equals 1, and $\eta a$ is about 90% when K equals 4.

When K is less than 1, $\eta a$ falls below 70% and thus good combustion in the auxiliary chamber cannot be expected. When K is greater than 4, $\eta a$ does not increase significantly. Accordingly, satisfactory operation is achieved when $Qa$ is in the range of K equals 1–4. In order to satisfy this requirement, the throttle valves controlling admission of lean mixture and controlling admission of rich mixture are mechanically interrelated, for example, by a cam mechanism, in order to control the $Qa$ and $Qm$ according to the opening degree of the main and auxiliary throttle valves.

The carburetor assembly employs a dual carburetor system for the main combustion chambers of the engine; since the $Qa$ control method mentioned above, however, is activated in relation to the opening degree of the main primary throttle valve, the amount of air inducted into the main combustion chamber increases when the main secondary throttle valve starts to open, resulting in decrease of $\lambda$.

Therefore, in order to compensate for this undesirable characteristic and to maintain $\lambda$ always at a proper value, it is necessary to increase the opening degree of the auxiliary throttle valve.

Therefore, a cam mechanism is employed having a contour path to significantly increase the opening degree of the auxiliary throttle valve at the time when a mechanism limiting the opening of the main secondary throttle valve is released.

The quantity of rich mixture supplied to the auxiliary combustion chamber is extremely small in comparison with that which is supplied into the main combustion chamber. Moreover, the air-fuel ratio of the mixture supplied to the auxiliary combustion chamber is very rich. As a result, therefore, even a small change in the amount of either air or fuel has a great effect on the quantity and quality of the mixture admitted into the auxiliary chamber. If the auxiliary passage in the carburetor assembly uses the same float chamber in common with the main primary passage and the main secondary passage, the fuel surface in the single float chamber tends to surge when the vehicle starts, accelerates, stops, or corners, and as a result the required accurate control of the quantity and quality of the air-fuel mixture cannot be achieved for the auxiliary combustion chamber. This is true because the quantity of air and fuel delivered through the main primary passage and the main secondary passage is much greater than that delivered to the auxiliary passage, and the size of the float chamber for such usage in common will necessarily be larger. Therefore, in accordance with this invention, two separate float chambers are provided in the same integral carburetor assembly. This minimizes surging of the fuel and contributes to accurate fuel metering.

In the carburetor assembly of this invention having a main carburetor with primary and secondary throats, the primary side which regulates the slow range including idling requires a fine adjustment screw for the idling orifice. The auxiliary carburetor of this carburetor assembly regulates the whole range and thus also requires a similar fine adjustment screw for its idling orifice. Both adjustment screws must be accessible from outside the carburetor assembly. By placing the main secondary passage between the main primary passage and the auxiliary passage, the needed adjustment for the two outside passages can be made from the exterior of the carburetor assembly.

When the throttle valves of the carburetor assembly supplying the main chamber and the auxiliary chamber are interconnected for dependent operation, the connection is such that the auxiliary throttle valve does not fully open at any time. The purpose of this relationship is to permit the relatively large pivot shaft for the auxiliarly valve from producing an adverse effect on the flow through the auxiliary passage, which adverse effect might disturb the λ ratio.

It is known to provide a heat insulator member between the carburetor and the engine manifold in order to minimize heat transmission from the engine tthe carburetor. In the device of the present invention, the thickness of the heat insulator is greatest directly below the auxiliary passage and auxiliary throttle. This provides maximum heat insulation for accurate metering. Moreover, the positioning of the auxiliary throttle valve above the level of the main throttle valves makes it possible to heat the rich mixture from the auxiliary passage by heat exchange with the engine exhaust, as described in said co-pending application. The extra thickness of the insulator avoids excessive temperatures at the throttle value while permitting full vaporization to be achieved by the time the rich mixture reaches the auxiliary combustion chamber.

Moreover, the high level of the auxiliary throttle valve promotes better distribution of rich mixture to each of the auxiliary combustion chamber of the engine.

Other objects and advantages will appear hereinafter.

Figure 1:
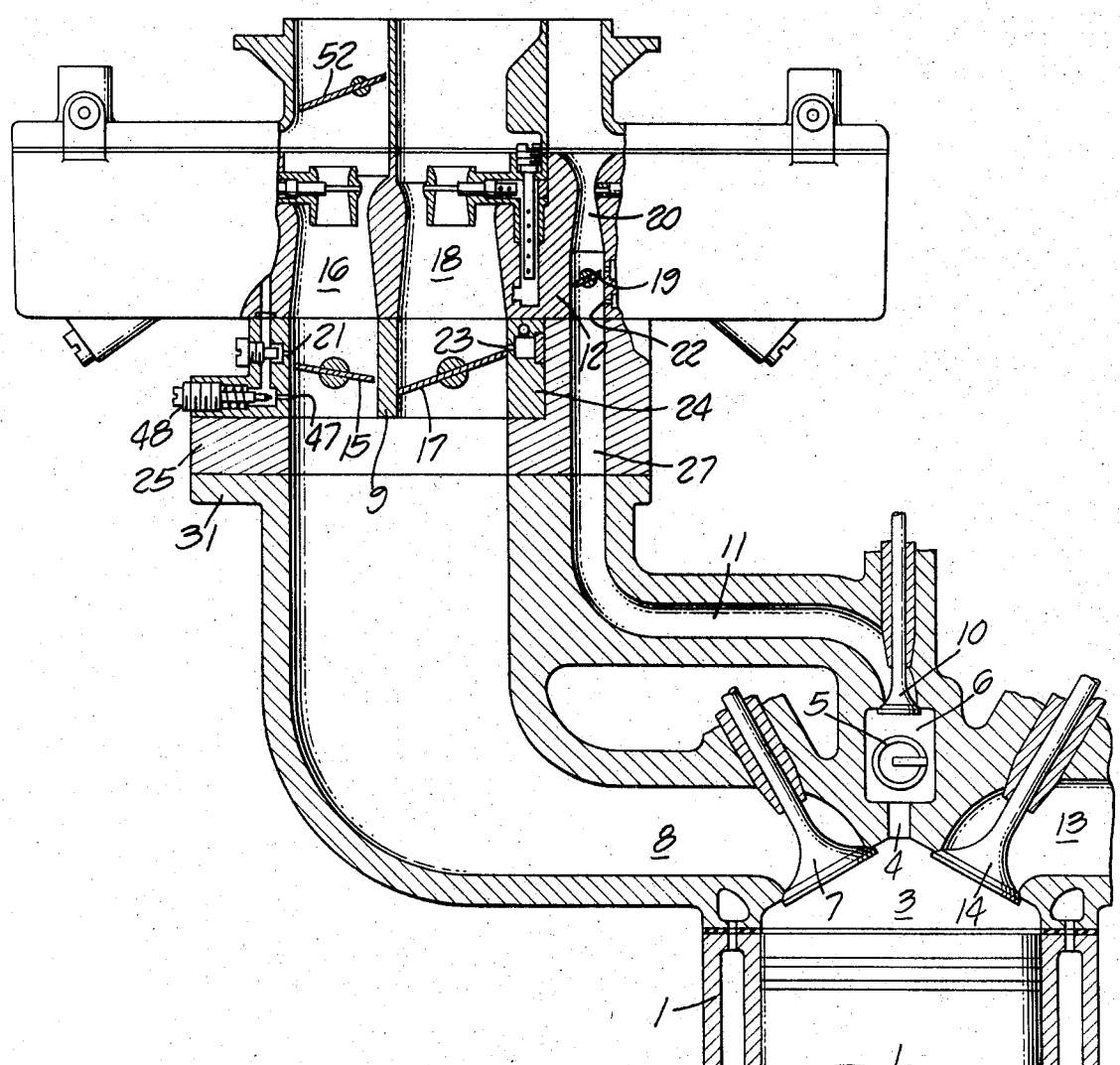
FIG. 1 is a sectional side elevation showing a preferred form of this invention.

Referring to the drawings, the internal combustion engine 1 has one or more pistons 2 each forming one wall of a main combustion chamber 3. A torch nozzle 4 establishes communication between the auxiliary combustion chamber 6 and the main combustion chamber 3, and this auxiliary chamber 6 is provided with a spark plug 5. The main combustion chamber 3 is supplied with a lean combustible mixture from a main carburetor 9 through a main inlet passage 8 having a main inlet valve 7. The auxiliary combustion chamber 6 is supplied with a rich combustible mixture from an auxiliary carburetor 12 through an auxiliary inlet passage 11 having an auxiliary inlet valve 10. Flow through the exhaust passage 13 from the main combustion chamber 3 is controlled by the exhaust valve 14.

The main carburetor 9 and the auxiliary carburetor 12 are integrated into a single assembly, and the main carburetor 9 is of compound type having a primary main passage 16 with a primary throttle valve 15, and a secondary main passage 18 with a secondary main throttle valve 17. The auxiliary carburetor 12 has a single auxiliary passage 20 controlled by an auxiliary throttle valve 19.

It is a feature of this invention that the passages 16, 18 and 20 are parallel and are arranged in a straight line, the secondary main passage 18 being positioned between the primary main passage 16 and the auxiliary passage 20. Accordingly, adjusting screws for the idling orifice 47 for the primary main pasage 16, and for the idling orifice 22 for the auxiliary passage 20 are both accessible for adjustment from the exterior of the carburetor assembly.

In accordance with a second feature of this invention, the throttle valve 15 for the primary main passage 16 and the throttle valve 17 for the secondary main passage 18 are positioned at approximately the same height, but the throttle valve 19 for the auxiliary passage 20 is positioned at a substantially higher elevation. The metal walls forming the passages 16 and 18 in the region of the throttle valves 15 and 17 are formed integrally from the same member 24, and the outer wall of this member is provided with a step port 23. This step port 23 is formed from the exterior of the carburetor member 24 before installation of the heat insulator member 25 between the lower end of the member 24 and the manifold flange 31. The heat insulator member 25 has an integral projecting portion 26 having a passage 27 forming a continuation of the auxiliary passage 20.

In another feature of this invention, the first float chamber 28 is provided for liquid fuel which is to be admitted into the main passages 16 and 18, and a separate float chamber 29 is provided for liquid fuel to be admitted into the auxiliary passage 20. Undesirable surging and variations in position of the liquid fuel in surfaces in the float chamber because of acceleration, deceleration or cornering of the vehicle are thus minimized. The float chamber mechanisms are substantially duplicates, except for size, and therefore a description of one will suffice. The float 32 is carried on the pivot shaft 33 between the arms 34 and carries an actuator 35 for operating the fuel inlet valve 36 to admit fuel into the float chamber 29. The float 32 closes the valve 36 when the liquid level 37 of fuel reaches the desired height. Liquid fuel from the chamber 29 passes through the main fuel jet 38 and eventually reaches the auxiliary passage 20 through the nozzle 39, slow port 40 and orifice 22 controlled by adjusting screw 42. Similarly, fuel in the chamber 28 passes through the main jet 44 and reaches the main primary passage 16 through the venturi port 45, slow port 21 and orifice 47 controlled by the adjusting screw 48. Liquid fuel also passes from the chamber 28 through the passageway 49 and reaches the main secondary passage 18 through the venturi port 50 and the step port 23.

The choke valve 52 is mounted in the main primary passage 16 above the level of the venturi port 45.

Figure 2:
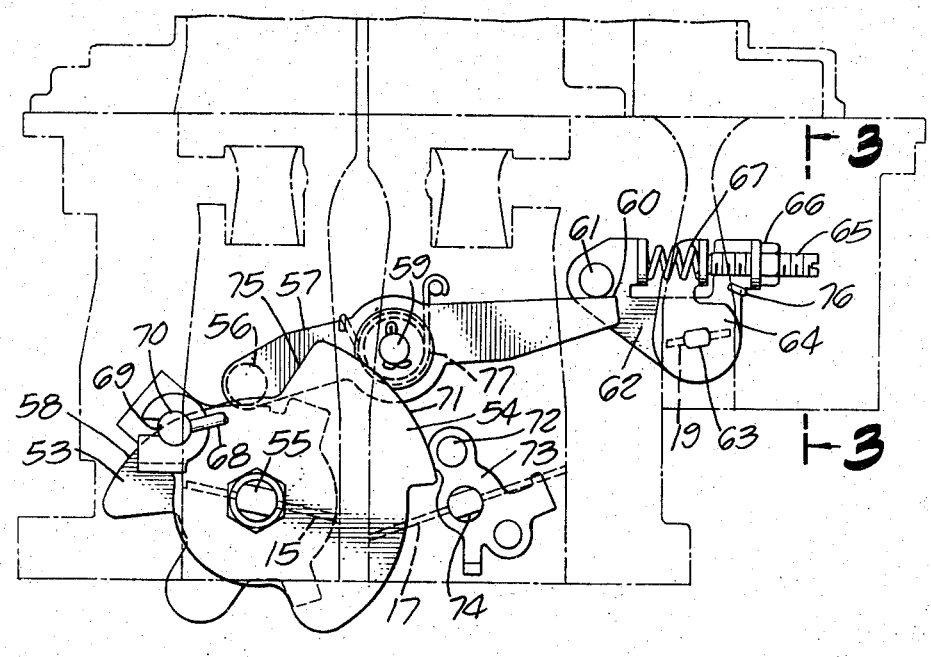
FIG. 2 is a side elevation showing cam and follower apparatus for controlling relative turning movement of the throttle valve for the primary main passage, the secondary main passage, and the auxiliary passage.
Figure 3:
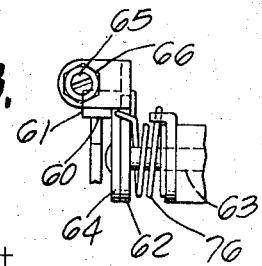
FIG. 3 is a detail taken substantially on the lines 3—3 as shown on FIG. 2.

Means are provided for controlling the relative turning movements of the throttle valves 15, 17 and 19 and, as best shown in FIGS. 2 and 3 of the drawings, this means includes a first cam 53 and a second cam 54 each fixed to the cross shaft 55 to which the throttle valve 15 is secured. A follower roller 56 carried on the lever 57 rides on the surface 58 of the cam 53. The lever is pivotally supported at 59 and is provided with a straight edge portion 60 engaged by a pin 61 carried on the arm 62. The arm 62 is pivotally mounted on the pivot shaft 63 for the auxiliary throttle valve 19. A companion arm 64 fixed to the pivot shaft 63 carries an adjusting screw 65 and lock nut 66 for angular adjustment of the arm 62 with respect to the arm 64 against the action of the coil compression spring 67. Once the adjustment screw 65 is set and locked, the arms 62 and 64 operate as a single integral unit. The purpose of the adjusting screw 65 is to take up any clearances between the parts 60 and 61 and 56 and 58 which develop because of manufacturing tolerances. The spring 76 acts to turn the arms 62 and 64 and throttle valve 19 in a counterclockwise direction as viewed in FIG. 2. The torsion spring 77 acts to turn the lever 57 about the pivot 59 in the same counterclockwise direction.

The throttle cable 68 has an end fitting 69 received in the socket 70 provided on the cam member 54. This cam member 54 also has an cam surface 71 which is engaged by a follower roller 72 carried on the arm 73 and fixed to the cross shaft 74 of the throttle valve 17.

From this description it will be understood that tensioning of the throttle cable 68 causes the cams 53 and 54 and the main primary throttle valve 15 to rotate clockwise as viewed in FIG. 2. This clockwise rotation causes the lever 57 to turn clockwise as the follower roller 56 rolls along the cam surface 58. This motion of the lever 57 causes counterclockwise movement ofthe arms 62, 64 and counterclockwise movement of the auxiliary throttle valve 19. The same clockwise movement of the cams 53 and 54 holds the main secondary throttle valve 17 closed while the follower roller 72 rides on the surface 71 which is of substantially constant radius. When the follower roller 72 reaches the surface 75, however, the follower roller and arm 73 are no longer prevented from turning the valve 17 toward open position. A vacuum operated diaphragm, opposed by a spring, both not shown, then controls the position at the throttle valve 17 in a conventional manner. The auxiliary throttle valve 19 never turns outside the projected area of its supporting shaft 63.

Figure 4:
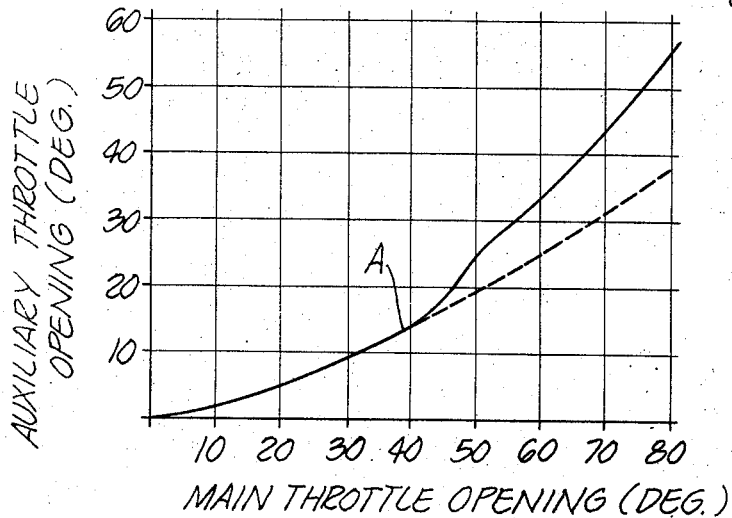
FIG. 4 is a graph showing the relationship of the degree of opening of the main primary throttle valve and the auxiliary throttle valve in a typical installation.
Figure 5:
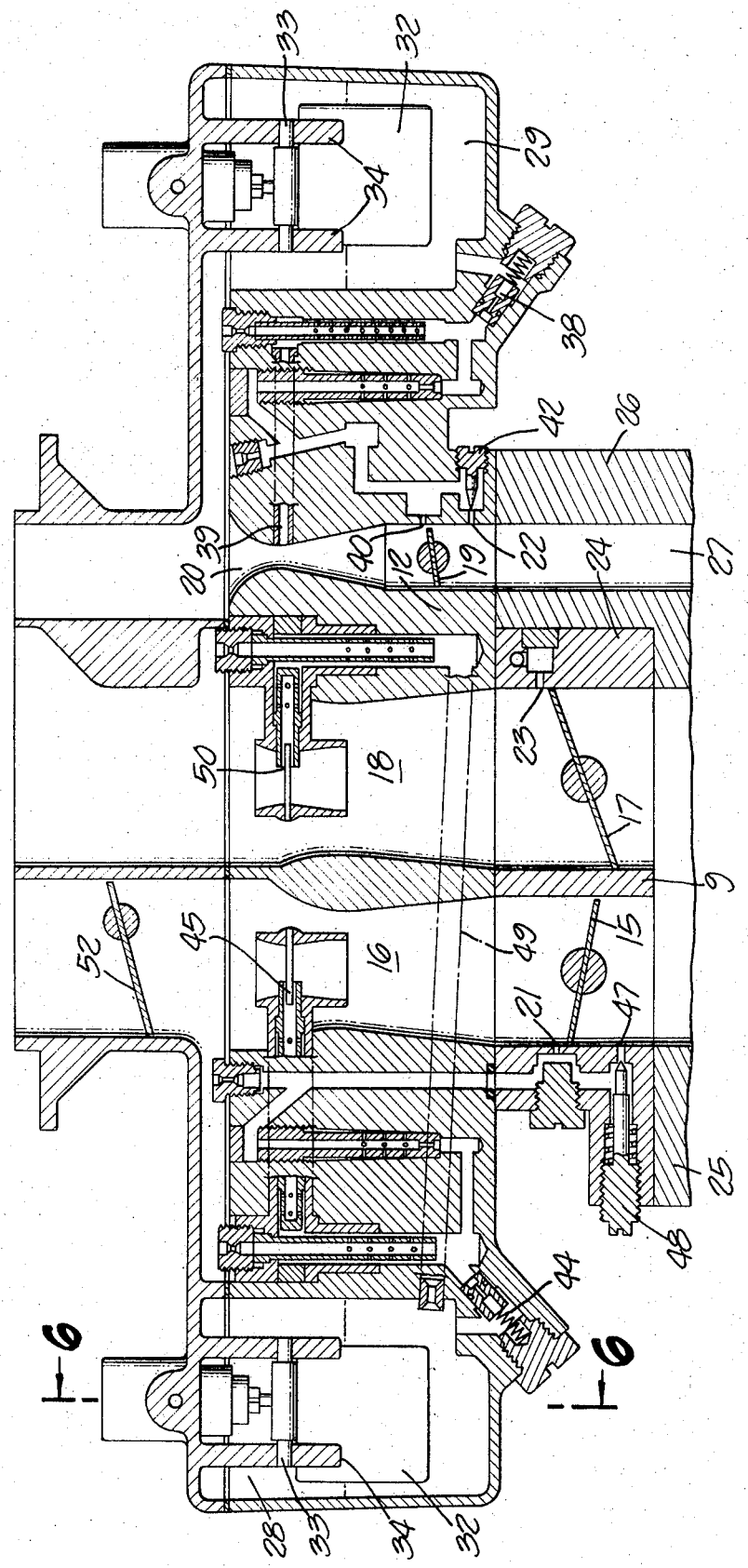
FIG. 5 is a transverse sectional view showing details of construction of the carburetor.
Figure 6:
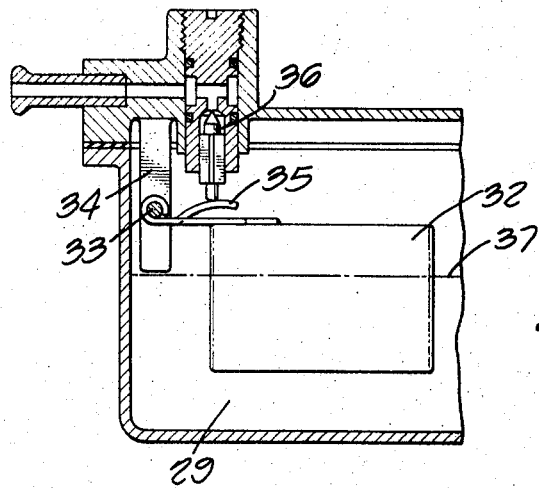
FIG. 6 is a sectional detail taken substantially on the lines 6—6 as shown on FIG. 5.
Figure 7:
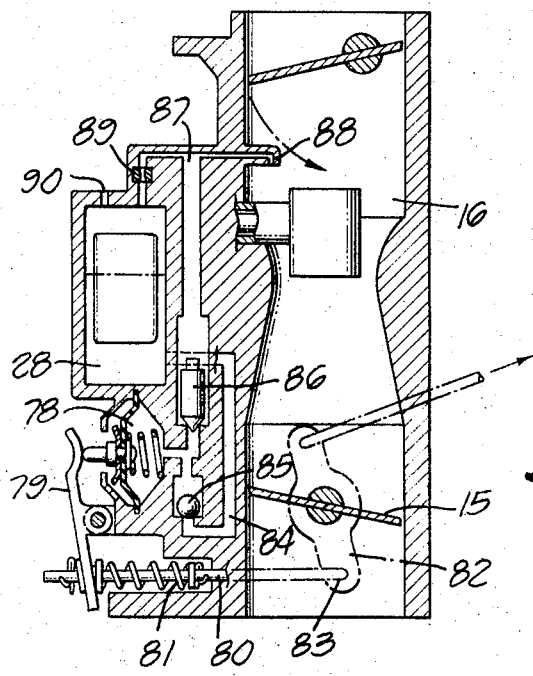
FIG. 7 is a sectional detail showing the use of an accelerator pump for the primary main passage.

The cam surface 58 is carefully chosen to produce the desired relative rotation between the throttle valves 15 and 19 from idling to full throttle position. The relative turning movements in a particular installation are shown in the chart of FIG. 4. The solid line curve to the right of letter A shows how the auxiliary throttle valve 19 opens rapidly to compensate for additional air admitted when the secondary throttle valve 17 opens. The dashed portion of the curve shows the proper angular opening for the auxiliary throttle valve 19 in the event that the secondary throttle valve 17 does not open.

An acceleration pump assembly shown diagrammatically in FIG. 4, includes an acceleration pump 78 operated by a pump lever 79 from an actuator rod 80 and spring 81. A crank arm 82 fixed to the main primary throttle valve 15 has a pivotal connection with the rod 80 at 83. Fuel from the float chamber 28 passes through passageway 84 and past the ball check valve 85 to the pump 78. When the lever 82 is turned in a clockwise direction, as viewed in FIG. 4, the pump 78 forces fuel past the valve 86 and through the passage 87 and out through the acceleration pump nozzle 88 into the main primary passage 16. A leakage orifice 89 connects the nozzle 88 with the upper portion of the float chamber 28 which is vented to atmosphere through the vent port 90.

Having fully described our invention, it is to be understood that we are not to be limited to the details herein set forth but that our invention is of the full scope of the appended claims.

We claim:

1. A carburetor assembly for use with an internal combustion engine having at least one main combustion chamber and an auxiliary combustion chamber connected thereto by a torch nozzle, said carburetor assembly having, in combination: a main primary passage having a main throttle valve, an auxiliary passage having an auxiliary throttle valve, a supporting shaft for the auxiliary throttle valve, means for connecting the main primary passage to deliver a lean mixture to the main combustion chamber of the engine, means connecting the auxiliary passage to deliver a rich mixture to the auxiliary combustion chamber of the engine, a cam connected to turn in accordance with turning movement of the main throttle valve, a stationary member, a lever pivotally mounted on said stationary member and having a follower cooperating with said cam, and additional cam and follower means whereby turning movement of the auxiliary throttle valve is controlled by pivotal movement of said lever.

2. The combination as set forth in claim 1 in which the turning movement of the auxiliary throttle valve is always outside the projected area of its supporting shaft.

3. The combination set forth in claim 2 in which a first float chamber is provided for supplying fuel to said main primary passage and secondary passage, and a second float chamber is provided for supplying fuel to said auxiliary passage.

4. A carburetor assembly for use with an internal combustion engine having at least one main combustion chamber and an auxiliary combustion chamber connected thereto by a torch nozzle, said carburetor assembly having, in combination: a main primary passage having a main throttle valve, an auxiliary passage having an auxiliary throttle valve, a supporting shaft for said auxiliary throttle valve, means for connecting the main primary passage to deliver a lean mixture to the main combustion chamber of the engine, means connecting the auxiliary passage to deliver a rich mixture to the auxiliary combustion chamber of the engine, means for varying the position of the auxiliary throttle valve so that the quantity of air delivered to the auxiliary combustion chamber is between 1 and 4 times the volume of the auxiliary combustion chamber, and means including cam mechanism for turning the auxiliary throttle valve in a predetermined manner with respect to turning movement of the main throttle valve, the range of turning movement of the auxiliary throttle valve being outside the projected area of its supporting shaft.

5. A carburetor assembly for use with an internal combustion engine having at least one main combustion chamber and an auxiliary combustion chamber connected thereto by a torch nozzle, said carburetor assembly having, in combination: a main primary passage, a main throttle valve therein, a main secondary passage having a secondary throttle valve therein, an auxiliary passage having an auxiliary throttle valve therein, the passages being parallel and arranged in a straight line with the auxiliary passage nearest the engine, the main secondary passage being positioned between the auxiliary passage and the main primary passage, the main primary throttle valve and the main secondary throttle valve being positioned at a low elevation and the auxiliary throttle valve being positioned at a high elevation, a heat insulator having a projecting portion provided with a passage forming a continuation of the auxiliary passage, means in the insulator forming continuations of the main primary passage and the main secondary passage being adapted to deliver a lean mixture to the main combustion chamber of the engine and the auxiliary passage being adapted to deliver a rich mixture to the auxiliary combustion chamber of the engine.

6. A carburetor assembly for use with an internal combustion engine having at least one main combustion chamber and an auxiliary combustion chamber connected thereto by a torch nozzle, said carburetor assembly having, in combination: a main body having a member fixed thereunder, a main primary passage in the body and member and having a main throttle valve mounted in said member, a main secondary passage in said body and member and having a secondary throttle valve mounted in said member, an auxiliary passage in said body having an auxiliary throttle valve mounted in said body, the passages being parallel and arranged in a straight line with the auxiliary passage nearest the engine, the main secondary passage being positioned between the auxiliary passage and the main primary passage, a heat insulator fixed to a lower side of said member and having a projecting portion contacting said body, said projecting portion having a passage forming a continuation of the auxiliary passage, means in the insulator forming continuations of the main primary passage and the main secondary passage being adapted to deliver a lean mixture to the main combustion chamber of the engine and the auxiliary passage being adapted to deliver a rich mixture to the auxiliary combustion chamber of the engine.

7. A carburetor assembly having a relatively large passage for supplying a lean mixture to main combustion chambers of an engine, the assembly having a relatively small passage for supplying a rich mixture to auxiliary combustion chambers of the engine, a main throttle valve in the large passage and an auxiliary throttle valve in the small passage, a supporting shaft for said auxiliary throttle valve, and means whereby turning movement of the main throttle valve acts to control turning movement of the auxiliary throttle valve, the range of turning movement of the auxiliary throttle valve being outside the projected area of its supporting shaft.

8. The combination set forth in claim 7 in which the quantity of air delivered to the auxiliary combustion chambers is between 1 and 4 times the combined volume of the auxiliary combustion chambers.

9. The combination set forth in claim 7 in which the carburetor assembly has a first float chamber for supplying fuel to the large passage and a second float chamber for supplying fuel to the small passage.

10. A carburetor assembly for use with an internal combustion engine having at least one main combustion chamber and an auxiliary combustion chamber connected thereto by a torch nozzle, said carburetor assembly having, in combination: a main primary passage, a main throttle valve therein, a main secondary passage having a secondary throttle valve therein, an auxiliary passage having an auxiliary throttle valve therein, the passages being parallel, the main secondary passage being positioned between the auxiliary passage and the main primary passage, the main primary throttle valve and the main secondary throttle valve being positioned at a low elevation and the auxiliary throttle valve being positioned at a high elevation, the main primary passage and the main secondary passage being adapted to deliver a lean mixture to the main combustion chamber of the engine, and the auxiliary passage being adapted to deliver a rich mixture to the auxiliary combustion chamber of the engine.

11. A carburetor assembly for use with an internal combustion engine having at least one main combustion chamber and an auxiliary combustion chamber connected thereto by a torch nozzle, said carburetor assembly having, in combination: a main primary passage having a main throttle valve therein, a main secondary passage having a secondary throttle valve therein, an auxiliary passage having an auxiliary throttle valve therein, the passages being parallel, said throttle valves being mounted to turn about parallel axes, the main secondary passage being positioned between the auxiliary passage and the main primary passage, the main primary throttle valve and the main secondary throttle valve being positioned at a low elevation and the auxiliary throttle valve being positioned at a high elevation, the main primary passage and the main secondary passage being adapted to deliver a lean mixture to the main combustion chamber of the engine, the auxiliary passage being adapted to deliver a rich mixture to the auxiliary combustion chamber of the engine, and means whereby turning movement of the main throttle valve acts to control turning movement of the auxiliary throttle valve.

* * * * *

UNITED STATES PATENT OFFICE
CERTIFICATE OF CORRECTION

Patent No. 3,842,810    Dated  October 22, 1974

Inventor(s)  Shizuo Yagi and Minoru Atsumi

It is certified that error appears in the above-identified patent and that said Letters Patent are hereby corrected as shown below:

Col. 1, line 56, after "volume" change "V" to read --Va--

Col. 3, line 8, "tthe" should read --to the--

Col. 3, line 19, "value" should read --valve--

Col. 3, line 24, "chamber" should read --chambers--

Col. 7, claim 5, fifth line from bottom, after "passage" insert --, the main primary passage and the main secondary passage--

Col. 7, claim 6, fifth line from bottom, after "passage" (second occurrence) insert --, the main primary passage and the main secondary passage--

Signed and sealed this 14th day of January 1975.

(SEAL)
Attest:

McCOY M. GIBSON JR.
Attesting Officer

C. MARSHALL DANN
Commissioner of Patents